US008819716B2

(12) United States Patent
Kim et al.

(10) Patent No.: US 8,819,716 B2
(45) Date of Patent: Aug. 26, 2014

(54) APPARATUS, SYSTEM, METHOD AND COMPUTER READABLE RECORDING MEDIUM STORING THE PROGRAM FOR RELATED RECOMMENDATION OF TV PROGRAM CONTENTS AND WEB CONTENTS

(71) Applicant: Korea Advanced Institute of Science and Technology, Daejeon (KR)

(72) Inventors: Munchurl Kim, Daejeon (KR); EunHui Kim, Daejeon (KR); Shinjee Pyo, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 13/758,317

(22) Filed: Feb. 4, 2013

(65) Prior Publication Data

US 2013/0205320 A1 Aug. 8, 2013

(30) Foreign Application Priority Data

Feb. 3, 2012 (KR) .......................... 10-2012-0011068

(51) Int. Cl.
*H04H 60/32* (2008.01)
(52) U.S. Cl.
USPC .................. 725/14; 725/9; 725/38; 725/46
(58) Field of Classification Search
CPC . H04N 21/466; H04N 21/482; H04N 21/812; H04N 21/4532; H04N 21/4582; H04N 21/44222; H04N 21/6582; H04N 7/163; H04N 7/17318; H04N 5/46; H04N 5/50; H04N 5/4401; H04N 5/44543

USPC ............................................ 725/9, 14, 38, 46
See application file for complete search history.

(56) References Cited

U.S. PATENT DOCUMENTS

| 7,051,352 | B1 | 5/2006 | Schaffer | |
|---|---|---|---|---|
| 2011/0143667 | A1* | 6/2011 | Cugnini et al. | 455/41.2 |
| 2011/0296452 | A1* | 12/2011 | Yu et al. | 725/9 |
| 2011/0320482 | A1* | 12/2011 | Barbieri et al. | 707/769 |
| 2012/0167127 | A1* | 6/2012 | Uchida et al. | 725/14 |

OTHER PUBLICATIONS

L. Ardissono et al., Personalized Recommendation of TV Programs, 2003, Springer Verlag in the Lecture Notes for Artificial Intelligence collection.

* cited by examiner

*Primary Examiner* — Mulugeta Mengesha
(74) *Attorney, Agent, or Firm* — Sherr & Jiang, PLLC

(57) ABSTRACT

Disclosure relates to an apparatus, system, and method for related recommendation of TV program contents and web contents that enable plentiful information acquisition and effective TV watching by discovering and recommending Internet web contents having a high association with the TV program contents when a TV is watched using a TV terminal connected to the Internet, and to a computer-readable recording medium having a program recorded thereon for executing the method. The apparatus includes: an user profile unit that produces and updates an user profile of a smart TV; a first information collection unit that collects first information that is TV program contents metadata from a smart TV network; a second information collection unit that collects second information that is web contents information from a web; and an integrated content database that stores third integrated information structured with correlation discovered between the first information and the second information.

9 Claims, 3 Drawing Sheets

APPARATUS, SYSTEM, METHOD AND COMPUTER READABLE RECORDING MEDIUM STORING THE PROGRAM FOR RELATED RECOMMENDATION OF TV PROGRAM CONTENTS AND WEB CONTENTS

CROSS-REFERENCE TO RELATED APPLICATION

This application claims priority to and the benefit of Korean Patent Application No. 2012-0011068, filed on Feb. 3, 2012, the disclosure of which is incorporated herein by reference in its entirety.

BACKGROUND

1. Field of the Invention

The present invention relates to an apparatus, system, method and computer readable recording medium storing the program for related recommendation of TV program content and web content. More specifically, the present invention relates to an apparatus, system, and method for related recommendation of TV program content and web content that make plentiful information acquisition and effective TV watching possible by discovering and recommending Internet web content having a high association with the TV program content when a TV is watched using a TV terminal connected to the Internet, and to a computer-readable recording medium having a program recorded thereon for executing the method.

2. Discussion of Related Art

With the recent advent of Internet protocol television (IPTV) and smart TV due to multichannel, multimedia, and fusion of broadcasting and communication, a boundary between TV program content and web content is becoming ambiguous. Technology for recommending TV program content preferred by a TV viewer and technology for recommending web content preferred by a web content user are being separately developed as an amount of both of the TV program content and the web content greatly increases.

The TV program content recommendation technology of the related art includes personalized TV program content recommendation technology for analyzing TV program watching record data of an user to infer preferences of watched TV program content and recommend TV program content to an individual user based on the preferences. Further, there are technology for enabling a variety of TV programs to be recommended by applying a collaborative filtering scheme to recommend TV programs watched by many other users that have watched the same TV program as that watched by an user, technology for aligning rankings of preferred TV program content for each user using inferred user preference information for TV programs and TV program content information (genre, channel, etc.) and determining a recommendation priority, and technology for enabling a personalized TV program content schedule to be recommended by applying a sequential pattern mining scheme based on watching record data of an user to infer an user watching pattern.

Representative web content recommendation technology of the related art includes item recommendation technology using collaborative filtering, which has been applied to electronic commerce or the like. Recommendation technology using collaborative filtering, which was first started by Amazon.com, in which when an user has purchased object A, object B purchased by many persons that have purchased object A is recommended to the user to recommend an object highly likely to be purchased by the user in the future, is being used. In Internet web content recommendation technology, a number of recommendations focused on customization rather than personalization are made under a decision that an user can participate actively as compared with a TV program watching environment. That is, technology for providing recommendation based on a basic profile of an user, such as enabling content broadcast on a channel to be immediately watched by arranging the content in a layout desired by the user or bookmarking a video channel desired by an user has been conventionally widely used.

However, in these related arts, the TV program content recommendation and the web content recommendation are only services provided in separate areas. The content recommendation is possible only in the respective areas of the TV program content and the web content, and technology for recommending associated web content and TV program content in a smart TV environment in which the TV program content and the web content can both be watched has not yet been implemented.

SUMMARY OF THE INVENTION

The present invention has been made to resolve the above problem, and an object of the present invention is to provide discovery and recommendation of web content recognized to be associated with a TV program when TV program content is watched on a TV terminal connected to a web (the Internet).

In order to resolve the above problem, according to a first aspect of the present invention, there is provided an apparatus for related recommendation of TV program content and web content, the apparatus including: an user profile unit that produces and updates an user profile of a smart TV; a first information collection unit that collects first information that is TV program content metadata from a smart TV network; a second information collection unit that collects second information that is web content information from a web; and an integrated content database that stores third integrated information structured with correlation discovered between the first information and the second information.

Further, there is provided an apparatus for related recommendation of TV program content and web content, wherein the integrated content database includes a feature vector using the first information and the second information, and each feature vector includes at least one item of a category, a cast, a production crew, a genre, a keyword, a title, and a topic of content.

Further, there is provided an apparatus for related recommendation of TV program content and web content, further including an user watching record database that stores a watching record of TV program content watched in the smart TV.

In order to resolve the above problem, according to a second aspect of the present invention, there is provided an apparatus for related recommendation of TV program content and web content, the apparatus including: an inter-content association inference unit that measures an association of web content with predetermined TV program content using each feature vector based on first information that is TV program content metadata and second information that is web content information; and an associated web content recommendation unit that recommends the web content having a high association to an user according to a predetermined criterion using a watching record of TV program content watched in the smart TV.

Further, there is provided an apparatus for related recommendation of TV program content and web content, wherein the inter-content association inference unit calculates the association using at least one of a vector space model, topic modeling, cosine similarity, and an association rule for the feature vector.

In order to resolve the above problem, according to a third aspect of the present invention, there is provided a system for related recommendation of TV program content and web content, the system including: a server that produces and updates an user profile of a client, collects first information that is TV program content metadata from a smart TV network, collects second information that is web content information from a web, and stores third integrated information structured with correlation discovered between the first information and the second information; and the client that measures an association of web content with predetermined TV program content using each feature vector based on the first information and the second information received from the server, and recommends the web content having a high association to an user according to a predetermined criterion using a watching record of TV program content watched by the client.

In order to resolve the above problem, according to a fourth aspect of the present invention, there is provided a method for related recommendation of TV program content and web content, the method including: an user profiling step of producing and updating an user profile of a smart TV; an user watching record storage step of storing a watching record of TV program content watched in the smart TV; a first information collection step of collecting first information that is TV program content metadata from a smart TV network; a second information collection step of collecting second information that is web content information from a web; and an integrated content storage step of storing third information structured with each feature vector using the first information and the second information, wherein each dimension of the feature vector includes at least one item of a category, a cast, a production crew, a genre, a keyword, a title, and a topic of content.

In order to resolve the above problem, according to a fifth aspect of the present invention, there is provided a method for related recommendation of TV program content and web content, the method including: an inter-content association inference step of measuring an association of web content with predetermined TV program content using at least one of a vector space model, topic modeling, cosine similarity, and an association rule for each feature vector, the feature vector being configured using first information that is TV program content metadata and second information that is web content information; and an associated web content recommendation step of recommending the web content having a high association to an user according to a predetermined criterion using a watching record of TV program content watched in a smart TV.

In order to resolve the above problem, according to a sixth aspect of the present invention, there is provided a computer-readable recording medium having a program recorded thereon for executing any one of the methods.

According to the present invention, it is possible to improve content comprehension and consumption satisfaction through consumption of plentiful web content associated with watched TV content.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail below with reference to the accompanying drawings. In the following description, well-known functions or configurations is not described in detail in order to keep the disclosure of the invention clear. Terms used herein have been chosen in consideration of functions in the present invention, and may vary depending on an user's or an operator's intentions, practice or the like. Therefore, the meanings of terms should be interpreted based on the overall context of the present specification.

In the present invention, an association between TV program content and web content is analyzed and the associated TV program content and web content is recommended to provide information related to the TV program content to an user (a viewer). In the related art, content has been recommended only in a limited area while in the present invention, TV program content and a variety of contents (e.g., images, videos, news, or rating) presented on the web are recommended together so that the user can access to desired information easily and conveniently.

Figure 1:
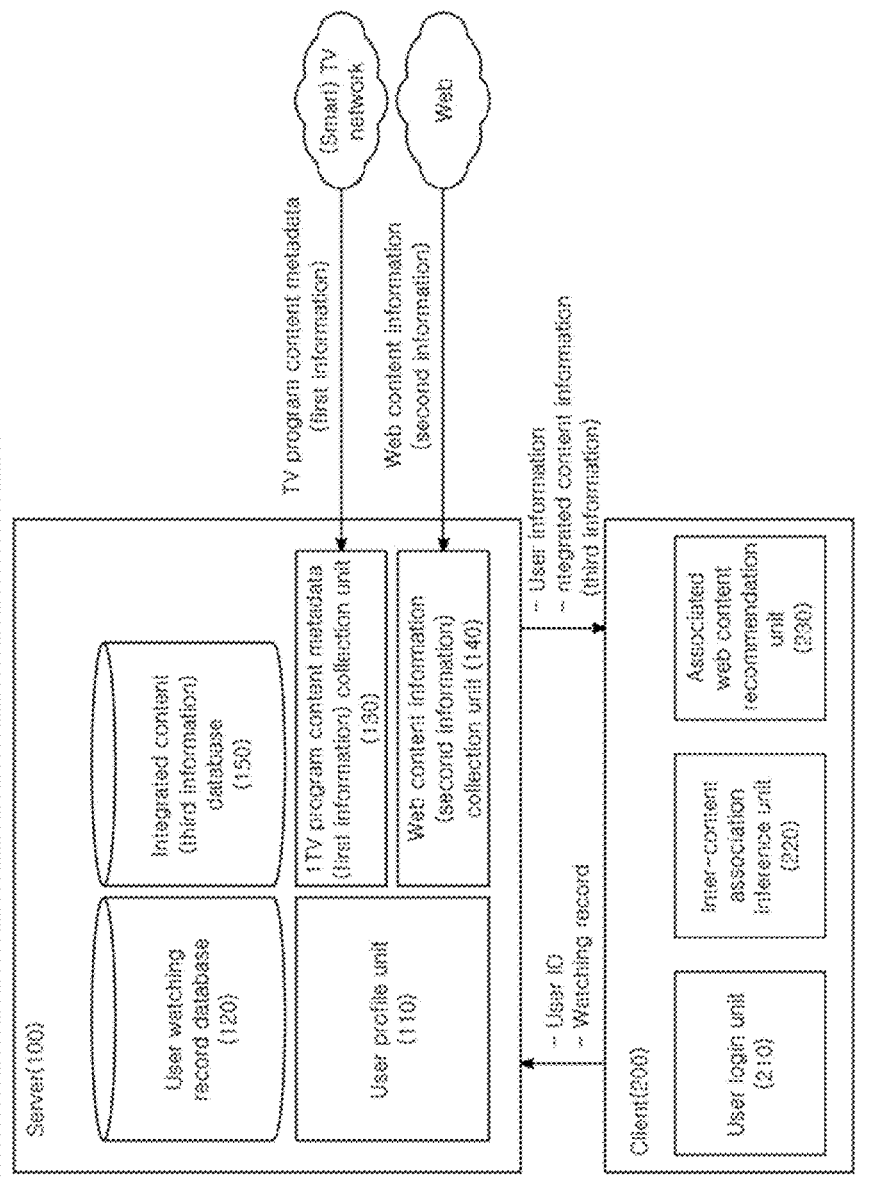
FIG. 1 is a block diagram illustrating an apparatus or system for related recommendation of TV program content and web content in accordance with example embodiments described herein.

FIG. 1 is a block diagram illustrating an apparatus or system for related recommendation of TV program content and web content in accordance with example embodiments described herein. The system of the present exemplary embodiment largely includes two apparatuses: a server 100 corresponding to a service provider, and a client 200 corresponding to a smart TV terminal user. The server 100 and the client 200 include internal components 110 to 150 and internal components 210 to 230, respectively. Here, some components such as an user watching record database 120 and an integrated content database 150 may be physically implemented external to the server 100, but in the present exemplary embodiment, the databases are assumed to belong to the server, for convenience of explanation.

Figure 2:
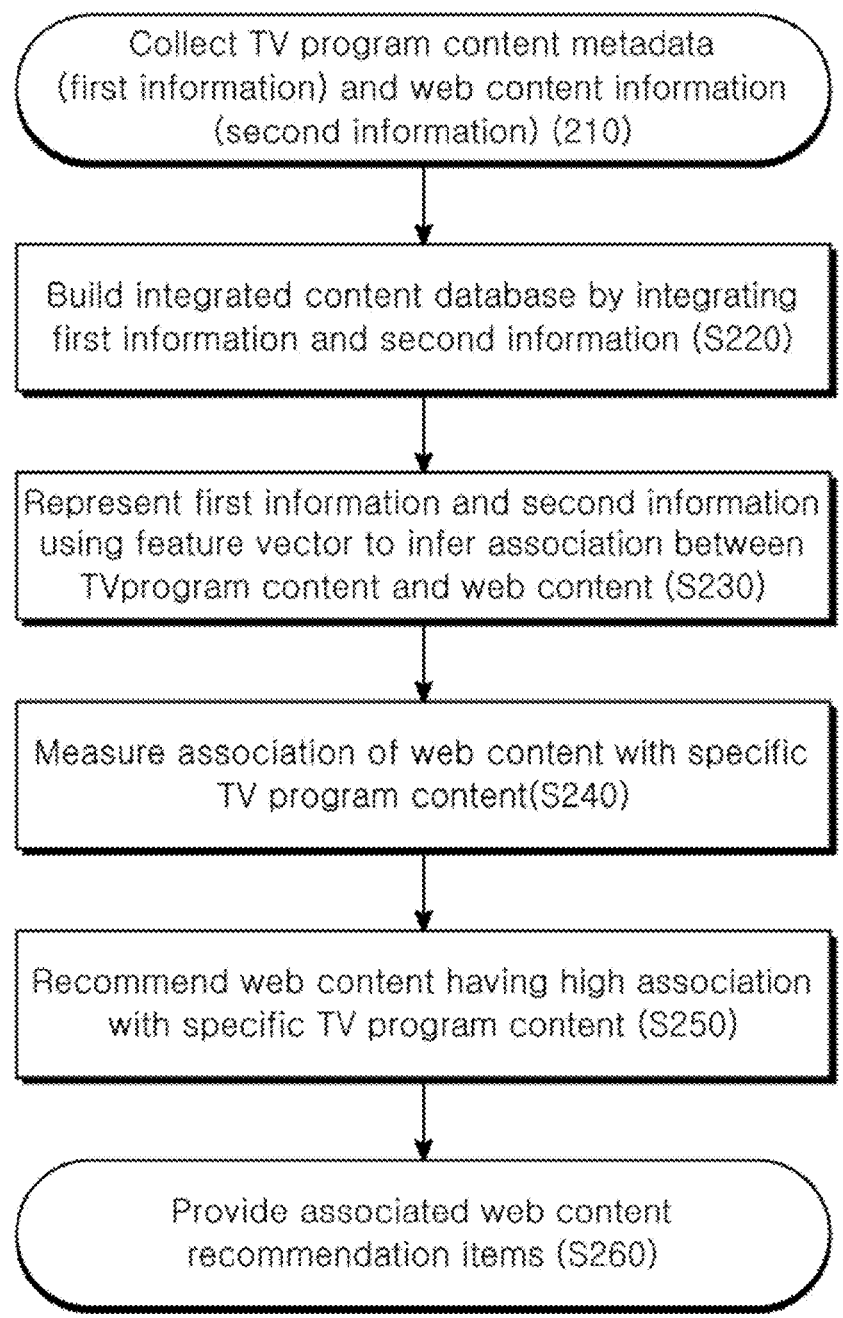
FIG. 2 is a flowchart illustrating a method for related recommendation of TV program content and web content in accordance with example embodiments described herein.

FIG. 2 is a flowchart illustrating a method for related recommendation of TV program content and web content in accordance with example embodiments described herein. The method of the present exemplary embodiment includes a process S210 of collecting information (first information) such as TV program content metadata, a process S210 of collecting web content information (second information), a process S240 of inferring an association between the TV program content and the web content, and a process S250 of recommending the related contents based on the association.

Hereinafter, corresponding exemplary embodiments will be described together in connection with a case in which the apparatus or system of FIG. 1 performs the method of FIG. 2, but the present invention may be implemented as a variety of exemplary embodiments, such as a case in which an apparatus different from the apparatus shown in FIG. 1 performs the method of FIG. 2 or the apparatus of FIG. 1 performs a method different from the method shown in FIG. 2.

When an user logs in, an user login unit 210 in the client 200 sends information on an user profile such as an user ID to an user profile unit 110 in the server 100. Then, TV program content currently watched by an user is delivered to the client 200, and the server 100 stores a watching record in the user watching record database 120.

A TV program content metadata (first information) collection unit 130 and a web content information collection unit 140 in the server 100 search for web content associated with the delivered TV program content. The first information collection unit 130 collects the first information from a smart TV network or the like, and the second information collection unit 140 collects the second information from a web or the Internet (S210).

The integrated content database 150 stores the third integrated information structured with a correlation between the first information and the second information (S220).

The integrated content database 150 may include a feature vector using the first information and the second information (S230). Here, each dimension of the feature vector may includes items that can represent a characteristic of content, such as a category, a cast, a production crew, a genre, a keyword, a title, or a topic of the content. Equation 1 below illustrates such a feature vector.

$$C_i = \begin{bmatrix} \text{title} \\ \text{keyword}_1 \\ \text{keyword}_2 \\ \vdots \\ \text{keyword}_N \\ \text{channel} \\ \text{indicator}(C_i) \end{bmatrix} \quad [\text{Equation 1}]$$

$C_i$: content corresponding to an index i, title: a title of the content $C_i$, $\text{keyword}_k$: description information of the content C, divided in units of words, N: the number of representable keywords defined in advance, channel: a channel on which the content C, is broadcast (null indicating no information), and indicator ($C_i$): an indicator indicating whether the content $C_i$ is TV program content or web content (e.g., indicator(V program content)=T and indicator(web content)=W).

Here, $\text{keyword}_k$ denotes a keyword of each of the collected TV program content metadata (the first information) and the web content information (the second information) divided in units of words. Even when metadata information whose format is determined according to the item such as a genre, a cast, a production crew or the like of the content cannot be obtained, the content may be represented by a variety of information components (keywords or words) describing the content. Here, order of the $\text{keyword}_k$ is irrelevant.

An inter-content association inference unit 220 discovers the association between the TV program content and the web content in cooperation with the TV program content metadata (first information) collection unit 130, the web content information collection unit 140 and the integrated content database 150 in the server 100 in order to discover web content associated with the delivered TV program content (S240).

A variety of schemes such as a vector space model, topic modeling, cosine similarity, and an association rule may be applied to the feature vector in order to measure a degree of the association of web content with specific TV program content.

A first method is a method of measuring the association degree of the content using a distribution of topics inferred by topic modeling.

In a document production model of the topic modeling scheme, a feature vector of each of specific TV program content and web content is defined by one document. Latent Dirichlet Allocation (LDA) that is one representative algorithm for topic modeling is a probabilistic production model and is a method of performing inference by considering how a document has been created. That is, when there are documents consisting of words, inference is performed in consideration of processes and causes through which the words are present in the documents. Accordingly, if content of the document can be modeled through such a document production model, variables for a known document can be reversely discovered.

Figure 3:
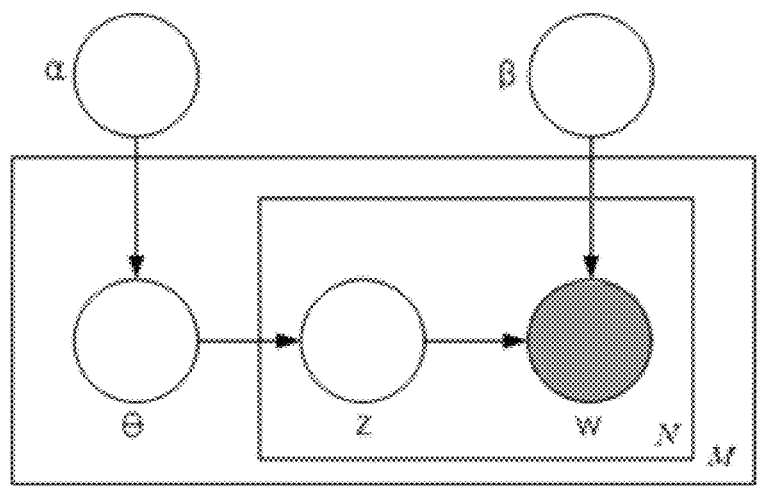
FIG. 3 is a conceptual diagram illustrating a case in which a topic modeling scheme is applied to inter-content association inference.

FIG. 3 is a conceptual diagram illustrating a case in which the topic modeling scheme is applied to inter-content association inference. This is a graphical model of LDA and shows how the LDA model models documents and words by using parameter values.

Here, M denotes the total number of documents, N denotes the number of words included in a specific document, $\alpha$ and $\beta$ denote parameters for an entire corpus, $\theta$ denotes a parameter indicating a proportion of a topic included in a document to create the document, w denotes an observable word, and z denotes a word related to a latent topic.

According to a document production process, the parameter values $\alpha$ and $\beta$ for the entire corpus are first determined, the parameter value $\theta$ relating to the proportion of the topic in the document is determined, the topic z of each word is determined according to a distribution of such a topic, and then the word w is finally determined in consideration of a word probability for the determined topic and all topics of all the words.

Equation 2 below may be applied to each document and Equations 3 and 4 may be applied to each word $w_n$. Here, the values $\alpha$, $\beta$ and $\theta$ should be obtained through inference.

$$\text{choose } \theta \sim \text{Dir}(\alpha) \quad [\text{Equation 2}]$$

$$\text{choose a topic } z_n \sim \text{Multinomial}(\theta) \quad [\text{Equation 3}]$$

$$\text{Choose a word } w_n \text{ from } p(w_n|z_n,\beta) \quad [\text{Equation 4}]$$

The inter-content association inference unit 220 may discover parameters through a method such as variational inference, Markov Chain Monte Carlo (MCMC) or expectation propagation based on the structured graphical model of LDA to discover latent topics present in the documents. As a result, each feature vector can be represented the predefined K topics by proportion($\theta$) due to elements constituting the feature vector. The feature vector of the TV program content and the feature vector of the web content may be represented by such a topic proportion, and associated web contents may be discovered in consideration of the topic proportion of the TV program content and the topic proportion of the web content.

A second method is a method of measuring an association between the feature vectors using the cosine similarity.

In this method, a modified feature vector for calculating the cosine similarity based on elements constituting the feature vector of the specific TV program content is defined as Equation 5 below.

$$C_{TV} = \begin{bmatrix} title \\ keyword_{C_{TV},1} \\ keyword_{C_{TV},2} \\ \vdots \\ keyword_{C_{TV},N} \\ channel_{C_{TV}} \\ indicator(C_{TV}) \end{bmatrix}$$ [Equation 5]

$$tC_{TV} = \begin{bmatrix} title \\ 1 \\ 1 \\ \vdots \\ 1 \\ 1 \\ indicator(C_{TV}) \end{bmatrix}$$ [Equation 6]

$$tC_{web,i} = \begin{bmatrix} title \\ indicator(keyword_{C_{TV},1}) \\ indicator(keyword_{C_{TV},2}) \\ \vdots \\ indicator(keyword_{C_{TV},N}) \\ indicator(channel_{C_{TV}}) \\ indicator(C_{web}) \end{bmatrix}$$ [Equation 7]

Here, Equation 5 shows the feature vector of the specific TV program, Equation 6 shows the modified feature vector in which keywords of the feature vector are all set to a reference value, i.e., 1, and Equation 7 shows a feature vector obtained by transforming the feature vector of the web content through a comparison with the keywords of the feature vector set as the reference. In Equations 5 to 7, the indicator is defined as Equation 8 below.

$$indicator(keyword_{C_{TV},1}) = \begin{cases} 1, & \text{if } keyword_{C_{TV},1} \in \{keyword_{C_{web,i}}\} \\ 0, & \text{otherwise} \end{cases}$$ [Equation 8]

The cosine similarity between the transformed web content feature vector and the transformed TV program feature vector, which is the reference vector, may be obtained using Equation 9 below.

$$similarity = \cos(\theta) = \frac{tC_{TV} \cdot tC_{web,i}}{\|tC_{TV}\| \|tC_{web,i}\|}$$ [Equation 9]

The cosine similarity between the transformed feature vector of the specific TV program content and the transformed feature vector of the web contents may be calculated for all web content feature vectors. A greater value of the cosine similarity may indicate web content having a higher association.

A third method is a method of inferring association between feature vectors using the association rule.

The feature vector of each of the specific TV program content and the web contents is regarded as transaction data, and the association rule is discovered for elements (keywords, channel information, etc.) constituting the vectors except for a feature title. In order to discover the association rule, values of support sup($x_j$) are calculated based on elements constituting the feature vector of the specific TV program content in an entire transaction database using Equation 10 below.

$$sup(x_j) = \frac{N(x_j)}{T}$$ [Equation 10]

where $x_j = j^{th}$ element of the feature vector $C_i$ of the specific TV program content, T=the number of transactions (all web content feature vectors) constituting the entire transaction database, and N($x_j$)=the number of transactions including $x_j$ in the entire transaction database.

Then, the sup($x_j$) values may be aligned in order of greater values and sup ($x_j$,$t_{x_jk}$) may be obtained for transactions (web content feature vectors) including $x_j$, as in Equation 11 below.

$$sup(x_j, t_{x_jk}) = P(x_j \cap t_{x_jk}) = \frac{|x_j \cap t_{x_jk}|}{|T_{x_j}|}$$ [Equation 11]

$t_{x_jk}$: a transaction (web content feature vector) including $x_j$, $T_{x_j}$: a set of transactions (web content feature vectors) including $x_j$,

|$T_{x_j}$|: the number of transactions including $x_j$.

Here, the value sup ($x_j$, $t_{x_jk}$) may be obtained for all $x_j$ and for $T_{x_j}$ of each $x_j$ to form the association rule using items exceeding a threshold. Accordingly, a keyword associated with the specific TV program content can be obtained and associated web content can be discovered through the feature vector of the web content including such an associated keyword.

The associated web content recommendation unit 230 aligns web content candidates having a high association with the specific TV program content in user's preference order using the association discovered by the inter-content association inference unit 220, the watching record delivered from the user watching record database 120, and the like, and provides associated web content recommendation items for the user (S260).

Modules, functional blocks or means of the present exemplary embodiments may be implemented using a variety of known elements such as electronic circuits, integrated circuits or application specific integrated circuits (ASICs), and may be implemented separately or in such a manner that two more of them are integrated.

While the exemplary embodiments of the present invention have been described above for understanding of the present invention, it will be apparent to those skilled in the art that the present invention is not limited to the exemplary embodiments described in the present specification and various variations, modifications and substitutions can be made to the present invention without departing from the spirit or scope of the invention. For example, the technology of the present invention may be applied to pictures, images or the like that can be displayed on a display, such as a liquid crystal display (LCD), rather than letters. Thus, it is intended that the present invention covers all variations and modifications belonging to the true spirit and scope of the prevent invention.

What is claimed is:

1. An apparatus for recommending related information of TV program contents and web contents, the apparatus comprising:

a user profile unit configured to produce and to update a user profile of a smart TV;

a first information collection unit configured to collect first information that is the TV program contents metadata from a smart TV network;

a second information collection unit configured to collect second information that is the web contents information from an Internet;

an inter-content association inference unit configured to determine a degree of an association between the first information and the second information by using a feature vector;

an integrated content database configured to store the related information according to the determined relationship between the first information and the second information; and an associated web content recommendation unit configured to provide a recommendation of the web content having related to a user according to a predetermined criterion using a record of TV program content while watching the smart TV.

2. The apparatus of claim 1, wherein the feature vector represents similarity information of content of the first information and the second information and includes at least one item (element) of a category, a cast, a production crew, a genre, a keyword, a title, and a topic of the content.

3. The apparatus of claim 1, further comprising a user watching record database configured to store a TV program content while watching the smart TV.

4. The apparatus of claim 1, wherein: the inter-content association inference unit is configured to calculate the degree of an association using at least one of a vector space model, topic modeling, cosine similarity, and an association rule for the feature vector.

5. A system for providing a recommendation of related information of TV program contents and web contents, the system comprising:

a server configured to produce and to update a user profile of a client, to collect first information that is TV program contents metadata from a smart TV network, to collect second information that is the web contents information from an Internet a web, and to store third information integrated with a correlation between the first information and the second information; and a client device configured to calculate a degree of an association between the web contents and a predetermined TV program contents using each feature vector based on the first information and the second information received from the server, and to recommend web content related to a user according to a predetermined criterion using a record of TV program contents while watching by the client.

6. A method for providing recommendation of TV program contents and web contents, the method comprising:

producing and updating a user profile of a smart TV;

storing TV program contents while watching the smart TV;

collecting first information that is TV program contents metadata from a smart TV network;

collecting second information that is the web contents information from a web;

determining a degree of an association between the first information and the second information by using a feature vector;

storing third information structured with each the feature vector using based on the first information and the second information, wherein each dimension of the feature vector includes at least one item of a category, a cast, a production crew, a genre, a keyword, a title, and a topic of content; and recommending the web content having a high association to a user according to a predetermined criterion using a record of TV program content while watching the smart TV.

7. A method for providing a recommendation of correlated information of TV program contents and web contents, the method comprising:

calculating a degree of an association between the web contents and a predetermined TV program contents using at least one of a vector space model, topic modeling, cosine similarity, and an association rule being applied to each feature vector, the feature vector being represented by at least one item of a category, a cast, a production crew, a genre, a keyword, a title, and a topic of content of TV program contents metadata and web contents information, the feature vector representing similarity information of content of the web contents and predetermined TV program contents; and recommending the web contents having a high association to a user according to a predetermined criterion using a record of TV program contents while watching a smart TV based on the calculation.

8. A non-transitory computer-readable recording medium having a program recorded thereon, which when executed, performs the method of claim 6.

9. A non-transitory computer-readable recording medium having a program recorded thereon, which when executed, performs the method of claim 7.

* * * * *